(12) United States Patent
Sako et al.

(10) Patent No.: US 7,426,751 B2
(45) Date of Patent: Sep. 16, 2008

(54) RECORDING MEDIUM, INFORMATION TRANSMISSION METHOD, TERMINAL, SERVER, AND RECORDING METHOD

(75) Inventors: Yoichiro Sako, Tokyo (JP); Shunsuke Furukawa, Tokyo (JP); Yoriaki Kanada, Kanagawa (JP); Etsuo Shibasaki, Tokyo (JP); Akiya Saito, Kanagawa (JP); Koichi Nakajima, Chiba (JP); Kaoru Kijima, Tokyo (JP); Akiko Inoue, Saitama (JP)

(73) Assignees: Sony Corporation, Tokyo (JP); Sony Disc & Digital Solutions Inc., Tokyo (JP)

( * ) Notice: Subject to any disclaimer, the term of this patent is extended or adjusted under 35 U.S.C. 154(b) by 865 days.

(21) Appl. No.: 10/490,210

(22) PCT Filed: Jul. 18, 2003

(86) PCT No.: PCT/JP03/09189

§ 371 (c)(1),
(2), (4) Date: Mar. 30, 2004

(87) PCT Pub. No.: WO2004/013757

PCT Pub. Date: Feb. 12, 2004

(65) Prior Publication Data

US 2004/0243831 A1  Dec. 2, 2004

(30) Foreign Application Priority Data

Jul. 31, 2002 (JP) ............................. 2002-223486

(51) Int. Cl.
*H04L 9/00* (2006.01)
*H04L 9/32* (2006.01)
(52) U.S. Cl. ........................................ 726/26; 380/201

(58) Field of Classification Search ................... 726/26; 380/201
See application file for complete search history.

(56) References Cited

U.S. PATENT DOCUMENTS

| | | | |
|---|---|---|---|
| 4,961,077 A | 10/1990 | Wilson et al. | |
| 5,563,947 A | 10/1996 | Kikinis | |
| 6,671,249 B2 * | 12/2003 | Horie | 369/275.3 |
| 6,724,705 B1 * | 4/2004 | Ko et al. | 369/53.21 |
| 6,744,713 B1 * | 6/2004 | Ko et al. | 369/47.1 |
| 7,058,284 B2 * | 6/2006 | Zou et al. | 386/94 |
| 2002/0099661 A1 | 7/2002 | Kll et al. | |
| 2002/0141741 A1 * | 10/2002 | Zou et al. | 386/125 |
| 2002/0150009 A1 * | 10/2002 | Tokumitsu et al. | 369/47.14 |
| 2003/0158950 A1 | 8/2003 | Sako | |
| 2005/0039032 A1 * | 2/2005 | Babowicz et al. | 713/193 |

FOREIGN PATENT DOCUMENTS

JP  6-203412  7/1994

(Continued)

*Primary Examiner*—Nasser Moazzami
*Assistant Examiner*—David Garcia Cervetti
(74) *Attorney, Agent, or Firm*—Oblon, Spivak, McClelland, Maier & Neustadt, P.C.

(57) ABSTRACT

A recording medium including at least a lead-in region, a recording region in which information is recorded, and a lead-out region. In this configuration, medium identification information that includes user identification information accessible by the user is recorded in at least any one of the lead-in region, the recording region, and the lead-out region.

26 Claims, 12 Drawing Sheets

FOREIGN PATENT DOCUMENTS

| | | |
|---|---|---|
| JP | 9-134330 | 5/1997 |
| JP | 10-503309 | 3/1998 |
| JP | 10-177554 | 6/1998 |
| JP | 11-98441 | 4/1999 |
| JP | 11-313282 | 11/1999 |
| JP | 11-328867 | 11/1999 |
| JP | 2000-76141 | 3/2000 |
| JP | 2000-339771 | 12/2000 |
| JP | 2000-339848 | 12/2000 |
| JP | 2001-332019 | 11/2001 |
| JP | 2002-74833 | 3/2002 |
| JP | 2002-076141 | 3/2002 |
| JP | 2002-191036 | 7/2002 |
| WO | WO 02/067125 A1 | 8/2002 |
| WO | WO 02/086859 A1 | 10/2002 |

* cited by examiner

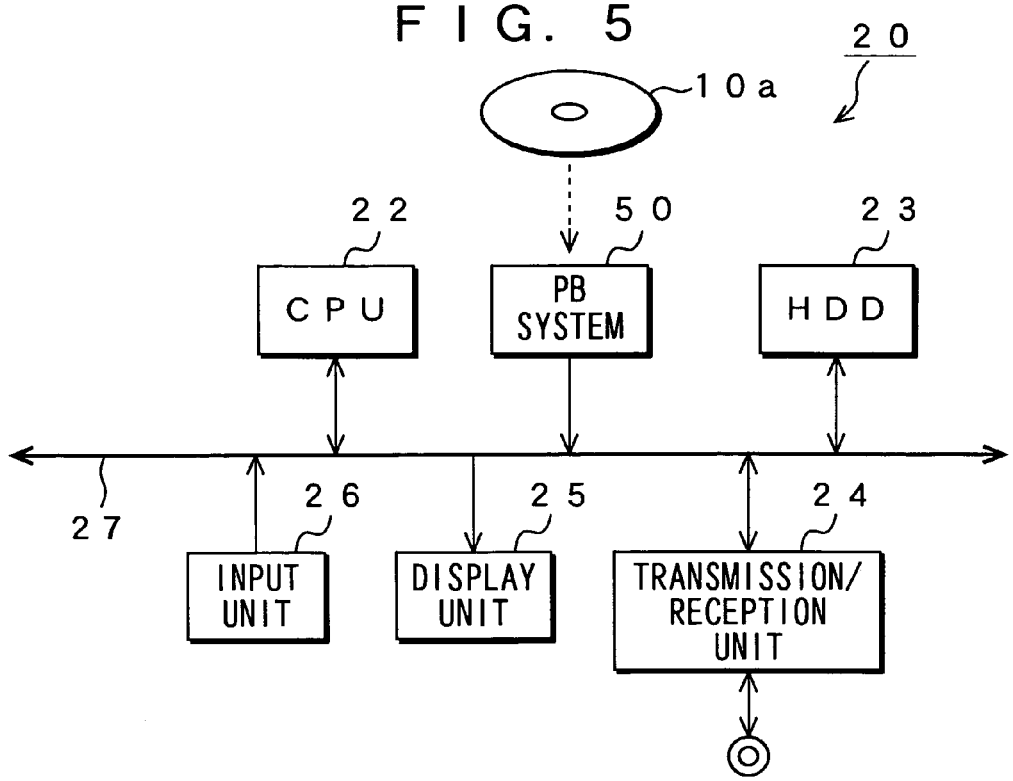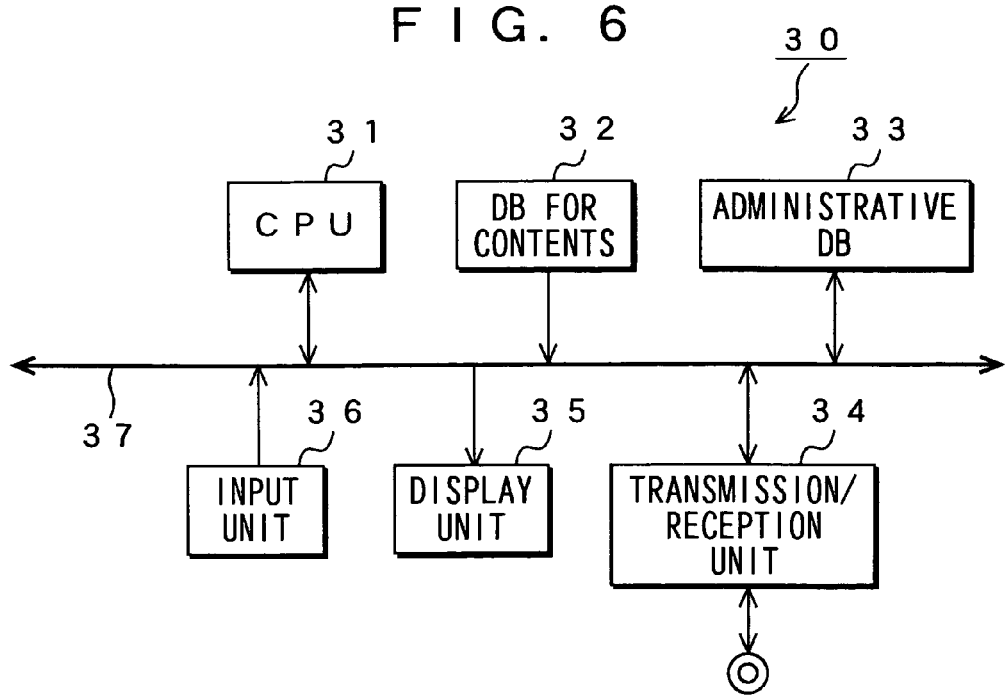

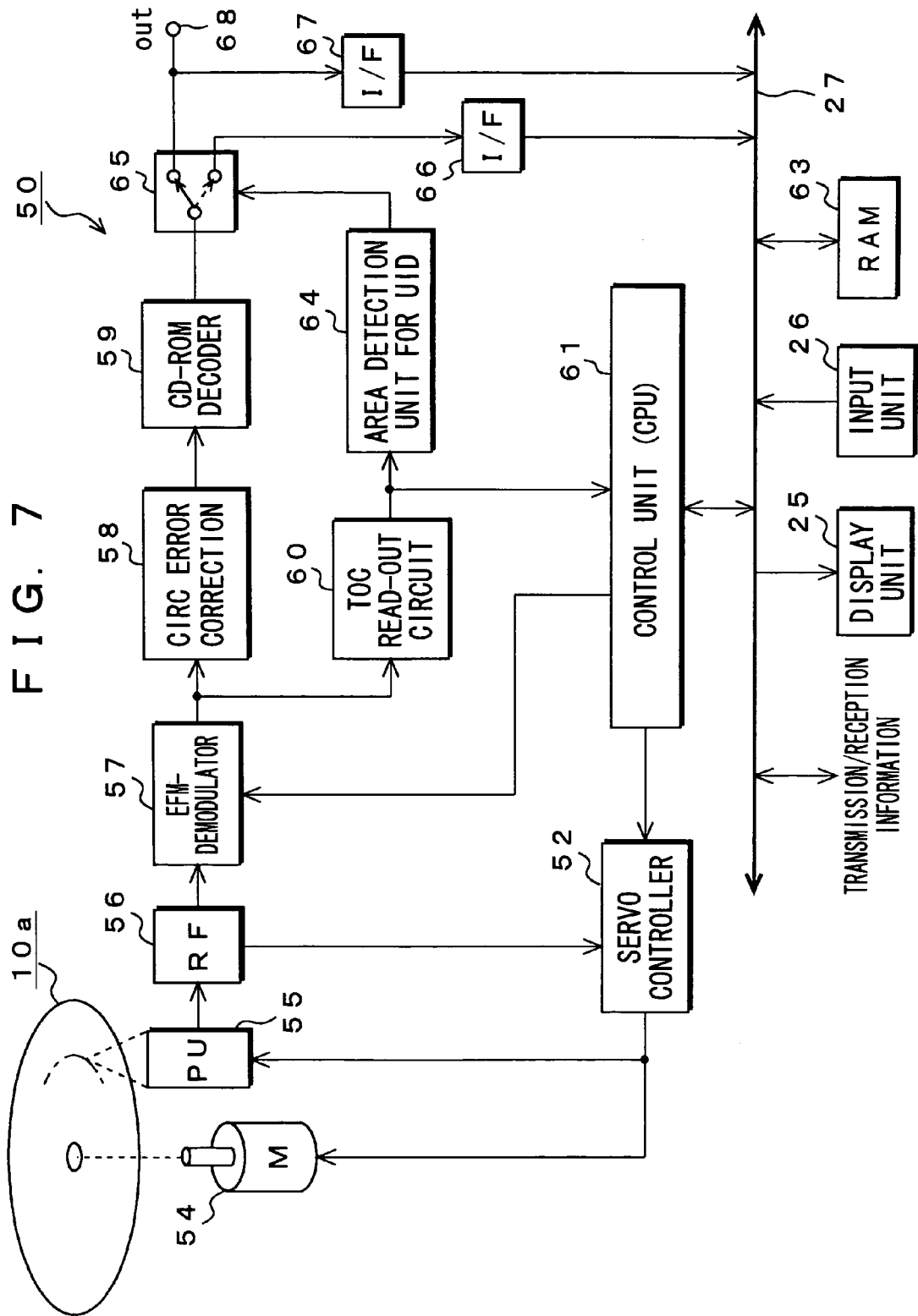

F I G. 9

| USER IDENTIFICATION INFORMATION (SERVICE-WINNING INFORMATION) | PROVISION OF A SERVICE |
|---|---|
| MSB ←――――→ LSB | |
| x x x ------ 0 0 0  ① | CONTENTS "A" FOR SPECIAL SERVICE |
| x a b ------ 1 0 1 | NULL RESULT |
| x y z ------ 0 0 0  ① | CONTENTS "A" FOR SPECIAL SERVICE |
| x a x ------ 0 0 1  ② | NULL RESULT |
| a b c ------ 0 1 0  ③ | NULL RESULT |
| a b c ------ 0 0 0  ① | CONTENTS "A" FOR SPECIAL SERVICE |
| x x x ------ 0 1 1  ④ | NULL RESULT |
| y y y ------ 0 0 0  ① | CONTENTS "A" FOR SPECIAL SERVICE |
| y y x ------ 1 0 0  ⑤ | CONTENTS "B" FOR SPECIAL SERVICE (ALL PARTICULAR FIGURES (000-100) ARE INDICATED) |
| SPECIAL IDENTIFICATION INFORMATION | |

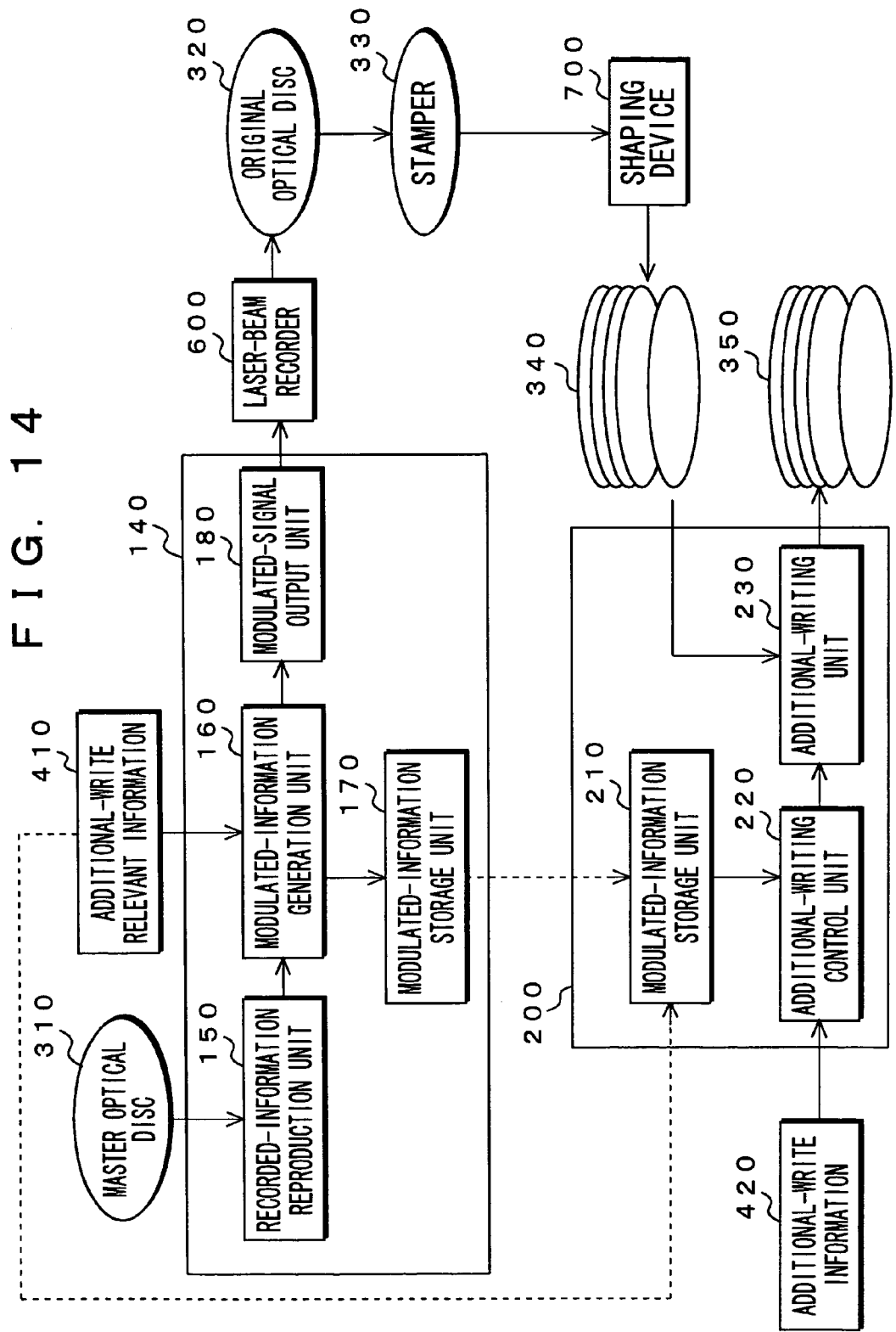

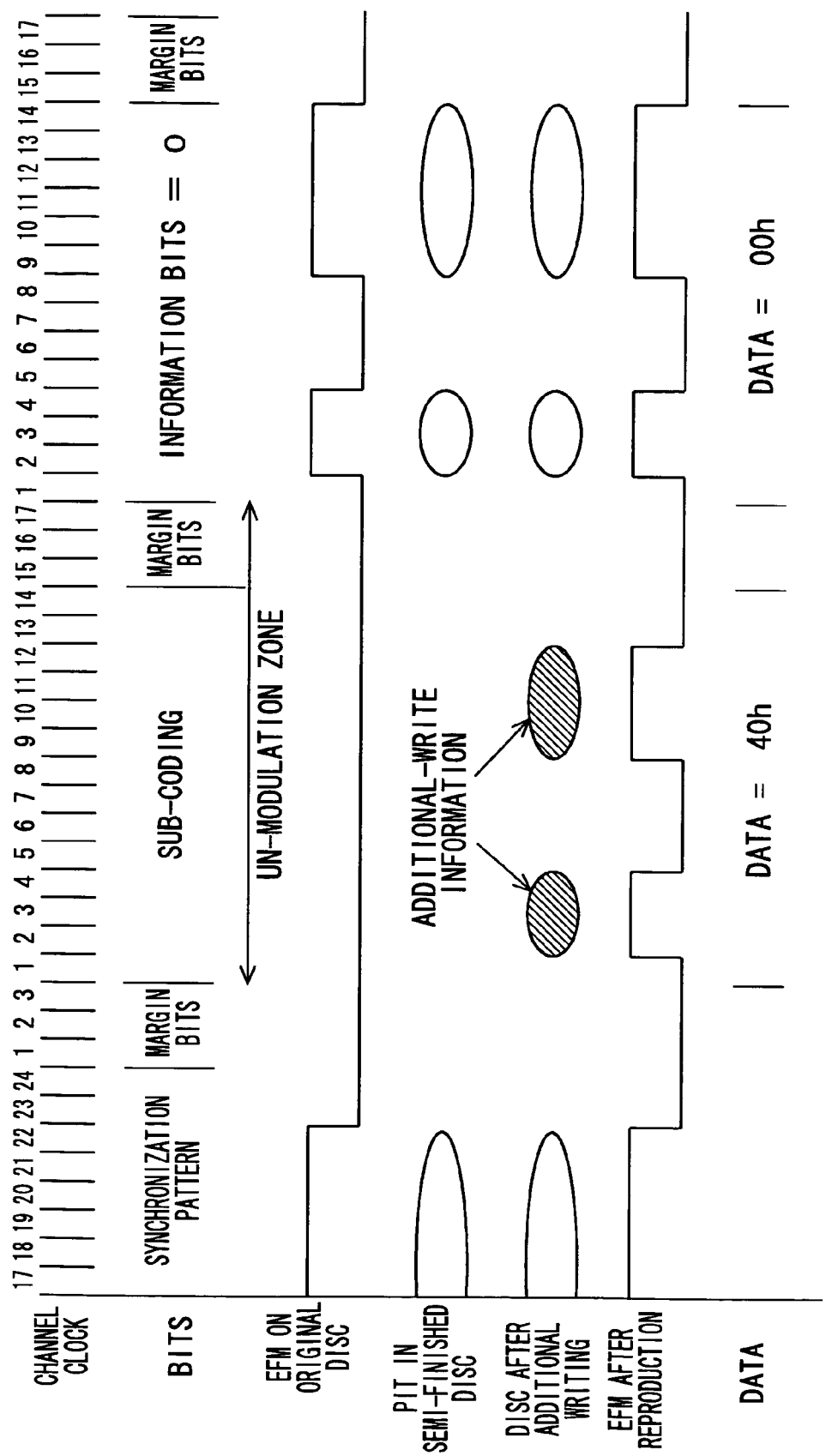

RECORDING MEDIUM, INFORMATION TRANSMISSION METHOD, TERMINAL, SERVER, AND RECORDING METHOD

TECHNICAL FIELD

The present invention relates to a recording medium, an information transmission method, a terminal device, a server device, and a recording method.

BACKGROUND ART

A recorded or recordable recording medium such as a compact disc (CD) and a digital versatile disc (DVD) and the like have been considered to record identification information (ID) peculiar to a recording medium thereon as medium information. This record of the medium information allows the medium information to be used as an identifier for deciding whether this recording medium is an authentic one or an illegally copied one.

Besides using the medium information as the identifier of recording medium, it is conceivable that a part of this medium information can be used as an identifier to acquire a particular service information (contents for service such as music, movie, and software) by accessing a particular service institution. If so, it is possible to utilize the medium information as means for a campaign to purchase a recording medium because providing the user who would purchase the recording medium with the particular service information causes his or her purchasing inclination to be fueled.

As the medium information, information available for utilization in any other ways (hereinafter referred to as "relevant information") can be added besides medium identification information for identifying the recording medium itself. Using the added relevant information, it is realized that a variety of services peculiar to the recording medium that is different from the above can be provided.

If the various services, for example, information recorded on a recording medium have been encrypted, it is possible that key information required for decryption of the information is acquired from an administrative server, which administers medium information. This is because, also in a case where information is to be recorded on a recording medium as encrypted, if key information (decryption key etc.) for decryption of the information is recorded on the same recording medium, the encrypted information can be decrypted using the key information recorded in the recording medium itself when the recording medium is illegally copied. Storing the key information separately from the recording medium allows such illegal utilization thereof to be eliminated.

Alternatively, if information indicating a classification of a recording medium is recorded as the relevant information, the information indicating the classification may be doubly used as information for identifying the medium together with the medium identification information. This allows an illegally copied recording medium to be eliminated effectively and certainly. According to this, protection of copyright on the information recorded on the recording medium may be realized.

If this relevant information is available, it is further possible to acquire information (contents) related to information recorded or to be recorded, that is, music information, information about artists etc. related to the music information, image information (still images, moving images), or digital information such as program data, which is used in a computer, on the circumstances.

As subjected recording medium, in addition to a write-once recording medium such as CD-Recordable (CD-R) and a rewritable recording medium such as CD-Rewritable (CD-RW), a reproduction-only recording medium such as CD-ROM disc and DVD-ROM disc where information is recorded as a plurality of pits having multiple irregular patterns beforehand, semiconductor memory, and the like are illustrated.

However, medium information recorded on the recording medium has been used for identifying the recording medium itself, and thus, it is necessary to make at least the medium identification information invisible from a user in the terms of security (as secret information). On the other hand, this medium information may be ranked at one function of an identifier required to enjoy the various services. If so, it would be preferable to make the medium information accessible from the user beforehand, i.e. visible therefrom.

DISCLOSURE OF THE INVENTION

According to the present invention, at least a part of medium identification information includes user identification information that is accessible by the user, namely, visible therefrom, and the user identification information may be made open as information that may be provided to the user, to realize various services with security of the recording medium being secured.

To solve these problems, a recording medium described in claim according to the present invention comprises a lead-in region, a recording region in which information is recorded, and a lead-out region, wherein medium information including medium identification information is recorded in at least any one of the lead-in region, the recording region, and the lead-out region, the medium identification information including user identification information that is accessible by the user.

An information transmission method described in claim 7 according to the present invention comprises the steps of transmitting, from a terminal device to a server device, medium information read out of a recording medium, the recording medium comprising a lead-in region, a recording region in which information is recorded, and a lead-out region, wherein medium information including medium identification information is recorded in at least any one of the lead-in region, the recording region, and the lead-out region, the medium identification information including user identification information that is accessible by a user, causing the server device to verify the transmitted medium information for authenticating it, and while performing check processing on the user identification information when the transmitted medium information is authenticated properly, controlling information transmission to the terminal device on the basis of a result of the check processing.

A terminal device described in claim 16 according to the present invention comprises a head portion for reading out information recorded on a recording medium comprising a lead-in region, a recording region in which information is recorded, and a lead-out region, wherein medium information including medium identification information is recorded in at least any one of the lead-in region, the recording region, and the lead-out region, the medium identification information including user identification information that is accessible by a user, a decode processing portion for performing decode processing on an output signal provided from this head portion, an extraction portion for extracting the medium information from an output signal provided from this decode processing portion, a transmission-and-reception portion for transmitting the medium information extracted by this extraction portion and receiving information transmitted from an outside, and a control portion for performing an operation control based on the information read out of the lead-in region of the recording medium by the head portion and the information received by the transmission-and-reception portion and allowing the user identification information read out of the recording medium by the head portion to be displayed.

A server device described in claim 20 according to the present invention comprises a transmission-and-reception portion for receiving medium information transmitted after being read out of a recording medium by a terminal device and transmitting information, the recording medium comprising a lead-in region, a recording region in which information is recorded, and a lead-out region, wherein at least medium identification information is recorded in at least any one of the lead-in region, the recording region, and the lead-out region, the medium identification information including user identification information that is accessible by a user, a storage portion in which at least administrative information including the medium information is stored, and a control portion for authenticating the medium information received based on the medium information received by the transmission-and-reception portion and the medium information stored in the storage portion, for allowing check processing of the user identification information to be performed when the received medium information is authenticated properly, and for controlling information transmission operation to the terminal device on the basis of a result of check processing.

A recording method described in claim 28 according to the present invention comprises the step of recording medium information including medium identification information, the medium identification information including user identification information that is accessible by a user, in at least any one of a lead-in region, a recording region, and a lead-out region of a recording medium, the recording medium comprising a disc substrate in whose one surface a plurality of irregular patterns based on information is formed, a reflection film formed on the one surface of the disc substrate, and a protection film for protecting this reflection film as well as the lead-in region, the recording region in which the above-mentioned information is recorded, and the lead-out region.

According to this invention, a side of the user has such a convenience that when the user identification information utilizing a part of the medium identification information is used as service-winning information, the side of the user may perform verification for checking winning number. Further, the user cannot see the medium identification information itself, thus allowing security of the recording medium to be maintained sufficiently. This causes a recording medium that has high-security performance and is difficult to be subject to illegal copy to be implemented, and a recording medium having any privilege to be provided.

According to this invention, the medium information including the user identification information is written in an area in the recording medium where data can be read therefrom but cannot be re-recorded (or rewritten) therein, thus preventing the medium information once recorded from being rewritten and copied so that the invention has a character that allows for preventing the medium information from being falsified.

According to this invention, the medium information is extracted and separated from the reproduced information on the basis of TOC information and sub-code data, and then saving the information so that it can be read at a necessary timing and only the user identification information, which is a part of the medium information, can be displayed on the display portion. This allows the user himself or herself to view the user identification information thus extracted and separated utilizing TOC information and sub-code data to identify it. Thus, the user can make sure that a number of the user identification information is winning number, without any difficulty, while a service pattern is administrated only by medium information when the medium information is used as information for receiving services accumulated in the administrative server, thus being convenient therefor.

According to the invention, it enables giving and receiving of information by use of the medium information by linking the terminal device having the medium information and the administrative server to each other via a communication network, so that it has a feature that user-desired services or customized different services can be smoothly realized using the medium information. In this case, the medium information is recorded on the recording medium and administered by the administrative server, so that the services can be administered independently of the terminal device, which also reproduces the recording medium.

In such a manner, according to the present invention, services causing user's purchasing inclination to be fueled can be realized only by the medium information with a security level of the medium identification information peculiar to the recording medium being kept.

BRIEF DESCRIPTION OF THE DRAWINGS

FIG. 5 is a system diagram of a substantial part for showing an embodiment of a terminal device related to the present invention;

FIG. 6 is a system diagram for showing an embodiment of an administrative server, which is a server device related to the present invention;

FIG. 7 is a system diagram of a substantial part for showing an embodiment of a medium information reproduction device to which the present invention can be applied;

FIG. 9 is a diagram for showing a relationship between user identification information and contents for services when the user identification information is special identification information;

FIG. 14 is a system diagram for showing an embodiment of a medium information recording device, which implements a recording method related to the present invention when medium information is recorded in a recorded recording medium; and FIG. 15 is an explanatory illustration of the operations thereof.

BEST MODE FOR CARRYING OUT THE INVENTION

The following will describe in detail one embodiment of information transmission method and the like, including a recording medium, related to the present invention with reference to drawings.

Figure 1:
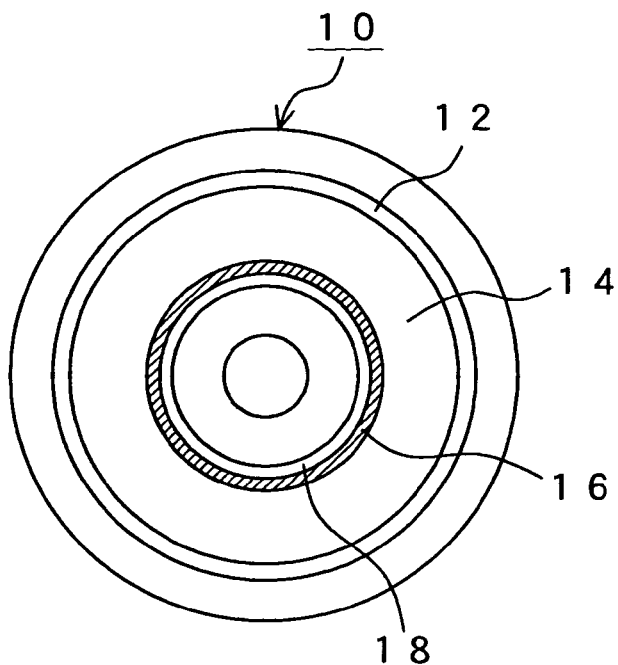
FIG. 1 is a conceptual diagram for showing an embodiment of a writable recording medium related to the present invention.

FIG. 1 shows a disc-shaped recording medium 10, which is a writable recording medium, related to the present invention. This recording medium 10 has a main recording region 14 and auxiliary recording regions 12, 16 and 18. The main recording region 14 is a region in which a terminal device (not shown) having record function can write information and the auxiliary recording regions 12 and 16 are regions in which a side of the terminal device cannot write it excluding finalization in the auxiliary recording regions 12 and 16 and a special condition such as initialization in the auxiliary recording region 18.

In the innermost-periphery region 18 of the auxiliary recording regions 12, 16 and 18, medium information, which will be described later, or the like is recorded and in the main recording region 14, original data (particular contents-data) is recorded.

A write-once CD-R disc or a rewritable CD-RW disc is illustrated as this writable recording medium. Adding the write-once CD-R disc and the rewritable CD-RW disc, a write-once DVD-R disc or a rewritable DVD-RW disc, etc. may be similarly illustrated.

As well known, the optical disc 10 has a basic construction such that a lead-out region 12 is positioned at an outermost periphery and, on its inner side, a program area (PA) 14, which is a contents-data recording area, is positioned. This program area 14 corresponds to the main recording region. On an inner-periphery side of the program area 14, a lead-in area 16 for recording Table of Contents (TOC) information is positioned, and then, on an inner-periphery side thereof, a program memory area (PMA) 18 is provided. The lead-out area 12, the lead-in area 16, and the program memory area 18 correspond to the above auxiliary recording region.

As well known, in the program memory area 18 of the write-once optical disc such as CD-R disc, temporary TOC information is recorded before complete processing or finalization processing to prohibit the information from being subsequently recorded and record the TOC information on the lead-in area 16 is performed. As far as temporary TOC information is recorded in the program memory area 18, contents-data can be written further in the program area 14. However, if an operation, which should perform complete processing, is performed, TOC information is written in the lead-in area 16, thus prohibiting the information from being subsequently recorded (written) on the program area 14.

Figure 2:
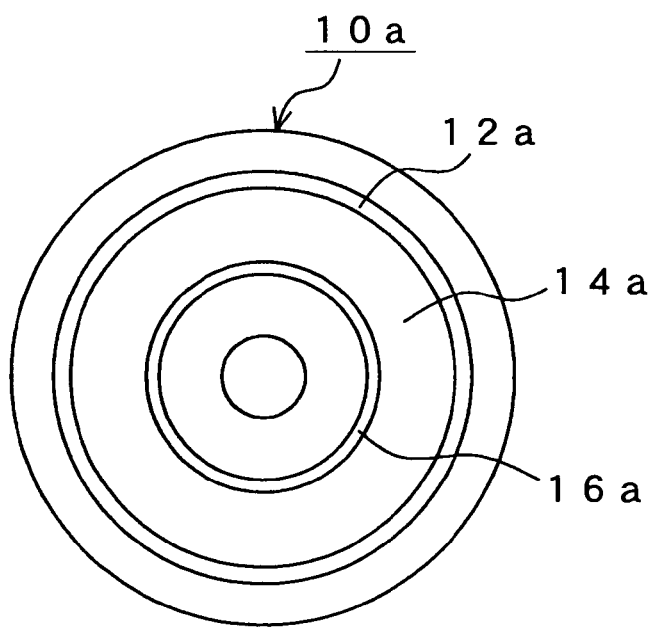
FIG. 2 is a conceptual diagram for showing an embodiment of a recorded recording medium related to the present invention.

FIG. 2 shows an optical disc serving as a reproduction-only recording medium in which data is recorded beforehand by a plurality of irregular patterns, so-called pits. This optical disc 10a comprises a program area 14a serving as a main recording region in which data is recorded, a lead-out area 12a placed on its outer-periphery side, and a lead-in area 16a placed on its inner-periphery side. A CD-ROM disc and a DVD-ROM disc may be illustrated as this reproduction-only recording medium.

On these recording media 10 and 10a shown in FIGS. 1 and 2, medium information UID is recorded. The medium information UID is used for authentication of a medium when a particular server device (hereinafter referred to as "administrative server"), which will be described later, is accessed or for acquiring information (contents-data for a service) accumulated at the administrative server after the authentication. The medium information UID is utilized for a service to be provided to a person who has purchased the recording media 10 or 10a legitimately.

According to the present invention, irrespective of whether a recording medium is a recorded reproduction-only recording medium or a recordable recorded medium, medium information (UID) peculiar to this medium is recorded thereon. The medium information UID contains medium identification information peculiar to the medium and relevant information related to the medium that is added to the medium identification information.

Figure 3:
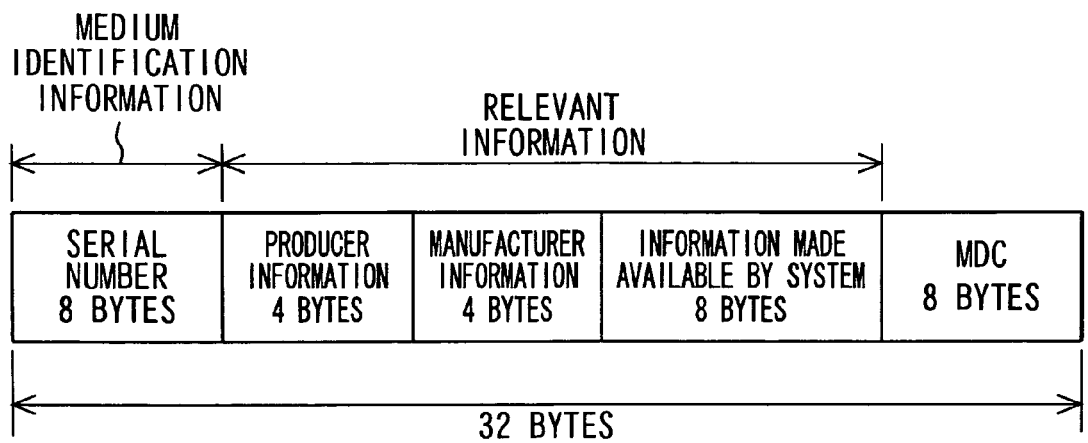
FIG. 3 is a diagram for showing an example of a format of medium information related to the present invention.

FIG. 3 shows its specific example of medium information UID containing medium identification information and relevant information. A format of the medium information UID shown in FIG. 3 consists of 32 bytes (256 bits) as a whole, in which a serial number (8 bytes) functioning as medium identification information is positioned at a top thereof. The medium identification information is peculiar to a relevant recording medium and information consisting of a serial number having a predetermined number of digits. This medium identification information is used to identify the recording medium itself. A part of the medium identification information, for example, predetermined number of bits (i.e., three bits) positioned starting at a side of LSB, is used as the user identification information. The user identification is used as service-winning information, serving as a kind of lottery ticket numbers.

Next to the serial number, relevant information is positioned. In an example shown in FIG. 3, the relevant information contains producer information, manufacturer information, and information made available by system, as shown in the figure. The producer information relates to contents-provider of the recording medium and label information thereof. Next, the manufacturer information is information that relates to, for example, a name of maker for recording medium itself (disc maker) and the information made available by the system includes a class of recording medium, decryption key information for encrypted text, information on service patterns subject to the recording media, and the like. The information on service patterns is information different from the information on the service given by the above-mentioned user identification information, and if the recording medium is recordable one, it is conceivable that the information on the service patterns is information indicating numbers of pieces of music that can be downloaded with charge, numbers of genres, or the like. The information on service patterns will be described later more in detail. The producer information and the manufacturer information are respectively configured to be four bytes while the information on service patterns is configured to be eight bytes taking an amount of information thereof into consideration.

Although, in the above embodiment, a part of medium identification information has been configured to be user identification information that may be identified by the user, namely, viewed from the user, it may be configured so that the user can identify not only the part of medium identification information, but the producer information and the manufacturer information. Particularly, when the producer information includes a name of artist, a recording studio, and the like, the information on the name of artist and the recording studio may be configured to be user identification information including a part of producer information because the information on the name of artist and the recording studio is be of use for the user.

At the end of the medium information UID, a code for prohibiting a falsification, for example, message digest code (MDC), is added by eight bytes as shown in FIG. 3 to form the medium information UID as shown in FIG. 3. An order of each pieces of the information as described above is not limited to the one shown in FIG. 3. A configuration of the relevant information may be slightly altered depending on a case which a relevant recording medium is a recorded reproduction-only one or recordable one.

An example of the medium information UID is shown in FIG. 3 and numbers of items to be included in the medium information UID, contents of each item, a kind of contents-data to be presented to the user that is accumulated in the side of administrative server, which will be described later, and the like may be arbitrarily chosen and selected.

An area recording the medium information UID is an arbitrary area where the medium information UID may be reproduced therefrom but the medium information UID may not be rewritten thereon. If a recording medium is a recorded reproduction-only one, the medium information is recorded in at least any one of the recording area (program area) where data has been recorded, the lead-in area, and the lead-out area using, for example, high-powered laser beam in a step following a step of recording original data. If a recording medium is a recordable one, it is recorded in a program memory area (PMA) positioned at inner radius thereof than the lead-in area using laser beam.

When the medium information UID is recorded on an area other than the program memory area, positional information indicating which address it is recorded, namely, address information is recorded in the lead-in area as one of pieces of the Table of Contents (TOC) information. When reproducing the recording medium, the medium information UID is read out of the recording medium as a rule referring to the address information recorded on the TOC information. The medium information UID thus read is saved and transmitted to a service institution, in this case, the administrative server (Web site) for the medium information through a communication network (the Internet and the like) at a proper timing.

Transmitting the medium information UID thus read out of the recording medium to the administrative server allows the administrative server to grasp contents of the medium information UID thus transmitted of the recording medium, thus providing to the user via the communication network service information, for example, contents-data for service, which has been prepared beforehand, when the user identification information in the medium information UID illustratively corresponds to a winning number.

The administrative server is provided with administrative database for medium information where information on password for identifying a user and the like have been recorded beforehand. For example, the information on password is then saved as the administrative information every time a recording medium is accessed.

Figure 4:
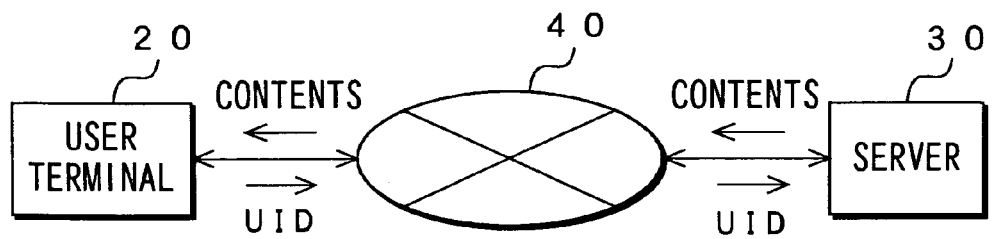
FIG. 4 is a conceptual diagram for showing an embodiment of an information service system to which the present invention can be applied.

An information service system to which the present invention can be applied is constituted, as shown in FIG. 4. In this information service system, at least one terminal device 20 for receiving services and an administrative server for medium information (Web site) 30 in which contents-data for service and the like are accumulated are connected to each other via the communication network 40 such as the Internet. Such services are provided that when the terminal device 20 transmits medium information UID read thereby to the administrative server 30 where if this transmitted medium information UID is authenticated properly, the administrative server 30 analyzes the medium information UID to accumulate the information therein. A service(s) in response to the medium information UID is (are) provided to the terminal device. Although, in FIG. 4, only one terminal device 20 connected with the administrative server 30 through the communication network 40 is illustrated, for better understanding of the description, multiple terminal devices 20 are actually connected therewith.

The terminal device 20 is provided with a reproduction unit (which may be a recording/reproduction unit) for reproducing a disc and a transmission/reception unit for transmitting/receiving data, respectively. The terminal device 20 can read and reproduce data recorded in the main recording area of the optical disc 10 or 10a serving as a recording medium and read the medium information UID recorded in the optical disc 10 or 10a to receive a particular service by using the medium information UID thus read. Therefore, the following will describe the present invention by using as an example the optical disc 10a (see FIG. 2), which is a recorded reproduction-only recording medium such as CD-ROM disc.

FIG. 5 shows a configuration of this terminal device 20, which has a medium information reproduction device 50 for reproducing the optical disc 10a as described above. This terminal device 20 comprises a control unit 22 constituted of a CPU for controlling the device as a whole, a storage unit 23 constituted of, in this case, a hard disc drive for recording and saving various kinds of data, and a data transmission/reception unit 24 (serving as a communication interface) for giving data to and receiving it from an outside, which units are connected to a bus 27. Furthermore, a display unit 25 such as an LCD and an input unit 26 constituted of a keyboard for inputting operation information are connected to each other via the bus 27.

By providing such a configuration, the terminal device 20 performs reproduction processing of data including the medium information UID from the optical disc 10a, data giving and reception processing to/from the outside for transmitting the medium information UID read out of the optical disc 10a to the administrative server 30 and receiving proper information from the outside, storage processing for storing the received data, and the like. The control unit 22 has a built-in memory (not shown) such as a ROM in which processing programs required to perform these processing items are stored.

FIG. 6 shows an outlined configuration of the administrative server 30. The configuration is such that the administrative server 30 authenticates the medium information UID transmitted from a user and, if the transmitted medium information UID is authenticated properly, a specified service is provided to the terminal device 20 of the user via the communication network 40. It also performs processing for medium administration and the like.

For this purpose, as shown in FIG. 6, this administrative server 30 comprises a control unit 31 having a CPU for controlling the device as a whole, a database unit 32 in which contents-data for service is accumulated, and an administrative database unit 33 in which a variety of kinds of the administrative information such as medium information UID peculiar to the optical disc and key information is accumulated. Besides these, it comprises a transmission/reception unit 34 (serving as a communication interface) for giving and receiving data to/from an outside, a display unit 35 constituted of an LCD for displaying information such as the medium information UID, an input unit 36 such as a keyboard or a mouse used for inputting of information, etc. The control unit 31 has a built-in memory (not shown) such as a ROM in which processing programs required to perform these processing items are stored. The control unit 31, the database unit 32, the administrative database unit 33, the transmission/reception unit 34, the display unit 35, and the input unit 36 are connected to each other via a bus 37.

FIG. 7 is a block diagram for showing a configuration of a substantial part of the medium information reproduction device 50 relative to the present invention. FIG. 7 shows an embodiment of the medium information reproduction device 50 when the above-mentioned medium information UID is recorded on the program area 14*a* in the optical disc 10*a*.

Controlling a servo controller 52 based on a control signal from the control unit 22 allows a spindle motor 54 to rotate to rotary-drive the optical disc 10*a* so that its linear velocity may be constant. With the optical disc 10*a* being rotated, an optical pickup unit 55 reads the information recorded on the optical disc 10*a*. Reflected light from the optical disc 10*a* is received and converted into an electric signal by a photo-detector of the optical pickup unit (head portion) 55. An output signal from the optical pickup unit 55 is supplied via an RF amplifier 56 to a demodulator 57 where it performs demodulation processing, that is, EFM demodulation processing on the information. Of the items of output data provided by the demodulator 57, output data corresponding to information read out of the program area 14*a* is further supplied to a downstream-side error correction/decryption circuit 58 serving as decode-processing unit where it performs error correction processing (CIRC error correction) and decryption processing. Output data from the error correction/decryption circuit 58 is then supplied to CD-ROM decoder 59 where it performs decode processing according to CD-ROM system. The output data from the decoder 59 includes original data (music data and the like) read out of the program area 14*a* of the optical disc 10*a* and the above-mentioned medium information UID.

On the other hand, the output data, which has performed EFM demodulation, from the demodulator 57 is also supplied to a read-out circuit 60 (information extraction unit) for extracting TOC information where the TOC information is extracted from the output data of the demodulator 57 and the extracted TOC information is saved in a memory such as RAM 63 via a control unit 61 for performing disc administration and the bus 27.

The TOC information output from the read-out circuit 60 is also supplied to area detection unit 64 for medium information UID where address information indicating a position where the medium information UID included in the TOC information is recorded is detected. This detected address information is utilized to separate the medium information UID from the output data of the decoder 59, which will be described later. Although such detection processing that the address information indicating a position where the medium information UID is recorded is detected from the TOC information has been performed using the area detection unit 64 serving as a special circuit in a case shown in FIG. 7, the control unit 61 may perform that detection processing.

A switch circuit 65 is controlled to switch based on the detected address information indicating a position where the medium information UID is recorded and then, only the medium information UID is separated from the output data of the decoder 59 to save it on the memory 63 serving as the storage unit via a downstream-side interface 66. Similarly, data included in the output data from the decoder 59 that has been separated Z at the switch circuit 65, namely, data including contents as the original data, which has been read out of the program area 14*a* of the optical disc 10*a*, is output to output processing unit, not shown, such as an audio reproduction circuit via output terminal 68 as reproduction output information. On the other hand, the data including the contents that is output from the switch circuit 65 may be also saved in the memory 63 via an interface 67.

If information recorded on the optical disc 10*a* has been encrypted, decryption processing is performed for decrypting cipher using key information provided from the administrative server 30. The key information is either a decryption key itself or, in some cases, information for creating legitimate decryption key. The key information configured so as to match security of the information service system is provided from the administrative server 30.

In response to input information from the input unit 26, the medium information UID recorded or saved on the memory 63 is read out thereof and then, the read medium information UID is transmitted to the administrative server 30 via the transmission/reception unit 24 (see FIG. 5) serving as a transmission/reception interface.

Figure 8:
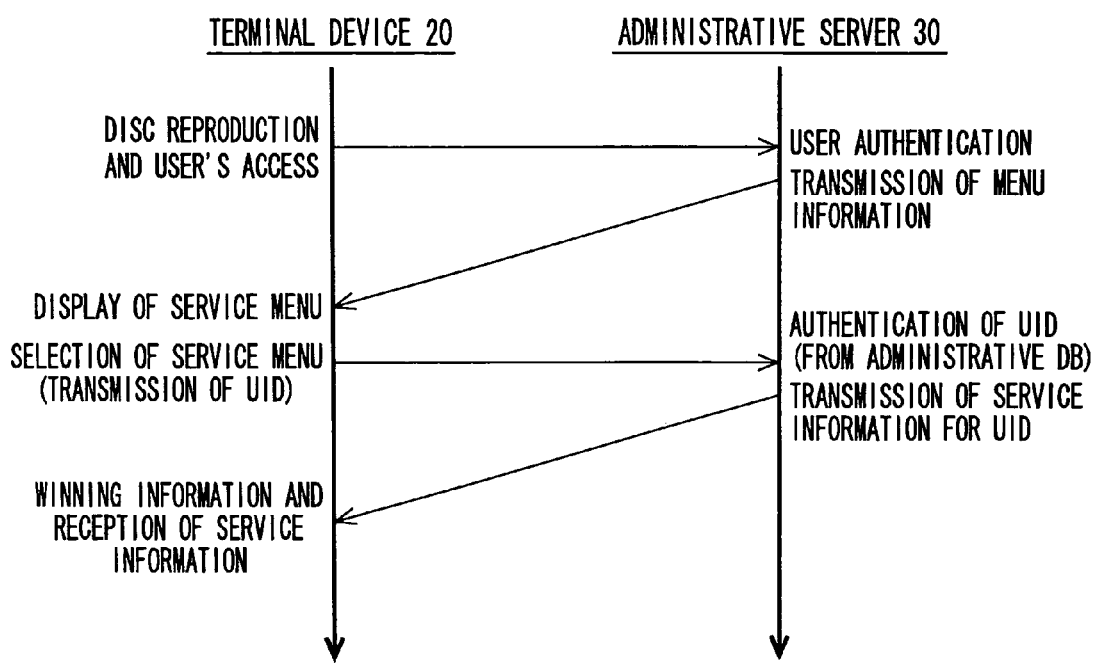
FIG. 8 is a flowchart for showing an information transmission method, which is an example of data processing between a terminal device and an administrative server.

The following will describe various processing examples in a case where the information service system is constituted as shown in FIG. 4, with reference to FIG. 8 and the following. FIG. 8 is an explanatory outline (flowchart) for explaining overall processing of this information service system. First, the terminal device 20 reproduces the optical disc 10*a* to acquire the medium information UID from the optical disc 10*a* that it has been recorded. This medium information UID read out of the optical disc 10*a* is saved in the memory 63. When the user requests to do so, the display unit 25 displays the user identification information among the medium information UID. The user identification information can be displayed simultaneously with reading the medium information UID out of the optical disc 10*a*.

Next, the user performs processing for accessing the administrative server 30 using the terminal device 20. In this case, since the user must be authenticated, the user transmits a password PW, which has been set up between him/her and the administrative server 30 beforehand. Based on the transmitted password PW, the administrative server 30 authenticates the user and, if he/she is authenticated properly, it transmits to the user, namely, his or her terminal device 20 menu information (service menu) to be handled on the administrative server 30. The terminal device 20, i.e. the user displays the service menu on its display unit 25 based on the transmitted menu information. If the user selects a submenu using the user identification information of the medium information UID from the displayed menu information, submenu selection information corresponding to the submenu thus selected is transmitted from the terminal device 20 to the administrative server 30.

At the administrative server 30, the medium information UID transmitted from the terminal device 20 is analyzed, for example, authenticated. Using medium identification information or relevant information in the medium information UID, the administrative server 30 authenticates the received medium information UID on whether it is legitimate medium information. This authentication processing of the medium information UID is done in order to exclude access etc. from an illegally copied recording medium. It is authenticated whether or not the transmitted medium information UID is legitimate medium information by comparing the transmitted medium information UID with the medium administrative information. In this case, the medium administrative information has been recorded on the administrative database unit 33. It relates to administrative information (which is the same information as the medium information) peculiar to a medium provided from a disc manufacturer or a disc trader. If the authentication processing of the transmitted medium information UID is finished, the administrative server 30 checks the user identification information among the medium identification information included in the received medium information UID. It checks the user identification information for information on winning number stored in the administrative database unit 33 of the administrative server 30. If the user identification information equals or matches the information on the winning number, the administrative server 30 transmits contents-data A for special service, which has been prepared beforehand, to the terminal device 20 so that the user can acquire the contents-data A. If the user accesses the administrative server 30 some times, it also transmits contents-data B for special service when multiple pieces of the stored user identification information match the information on winning number group, to the terminal device 20 so that the user can acquire the contents-data B.

If the medium information UID includes the relevant information, the following giving and receiving of data is illustratively performed between the administrative server 30 and the terminal device 20 in addition to the above-mentioned processing in the medium identification information. For example, in the reproduction-only recording medium in which multiple pieces of music are recorded previously by multiple pits, when the numbers of pieces to be serviced according to a prepaid charge are different from the ones recorded, it is presumed that the information recorded on the optical disc 10a has been ciphered. In this case, the user acquires key information according to the prepaid charge from the administrative server 30. He or she keeps or stores the key information acquired from the administrative server 30 in the memory 63 and decrypts the information read out of the optical disc 10a using the key information kept in the memory 63. If the information recorded on the optical disc 10a is music data, for example, the ciphered music data is decrypted and reproduced using the key information.

If the optical disc load in the terminal device 20 as a recording medium is writable one, i.e., recordable optical disc, information-recording-and-reproducing device, not shown, is prepared in behalf of the information reproduction device 50 shown in FIG. 7 since the data transmitted from the administrative server 30 is the data to be recorded on the recording medium, so that the information-recording-and-reproducing device can record the data transmitted from the administrative server 30, i.e., the downloaded data on the optical disc as the recording medium. If the downloaded data is ciphered when it is transmitted from the administrative server 30, taking a security of the information service system into consideration, it is necessary to acquire the key information for decrypting the ciphered and transmitted data simultaneously with the download of the data.

FIG. 9 shows a relationship between user identification information and information on winning numbers and, in a case shown in FIG. 9, a part of the medium identification information constituting the medium information UID is used as the user identification information. Such the medium identification information consists of a serial number containing multiple digits as described above. In this embodiment, digits by lower three bits on LSB side are used as the user identification information. This user identification information constitutes service-winning information, and thus, it functions as special identification information.

In a case shown in FIG. 9, the information on the winning number is indicated as "000" (expressed in bits). Thus, when special identification information indicated by lower three bits on LSB side is "000" (leading bit is LSB), the medium identification information is made available for receiving a service, thus providing to the user contents-data "A" for special service that has been prepared in the administrative server 30 beforehand.

Further, when all the five kinds of user identification information such as "000", "001", "010", "110", and "011" and "100" are indicated as special identification information, contents-data "B" for another special service may be also provided to the user. Therefore, if the same user accesses the administrative server, the administrative database unit 33 saves the medium information, particularly the medium identification information every user at each access time. When the user accesses it and the above five kinds of user identification information are indicated, the contents-data "B" for special service may be also provided to the user. Such the contents-data for special service to be provided to the user in this time is not limited to any kinds or genres of the provided data, thus music data, data on motion or still image, data about profile of a particular artist or data on game software is available as them.

A value or the number of digits of information on the winning number may be altered, not fixed. For example, the information on the winning number may be altered at each regular period of time such as a week and a month, thereby allowing larger number of users to receive the contents-data for special service.

Figure 10:
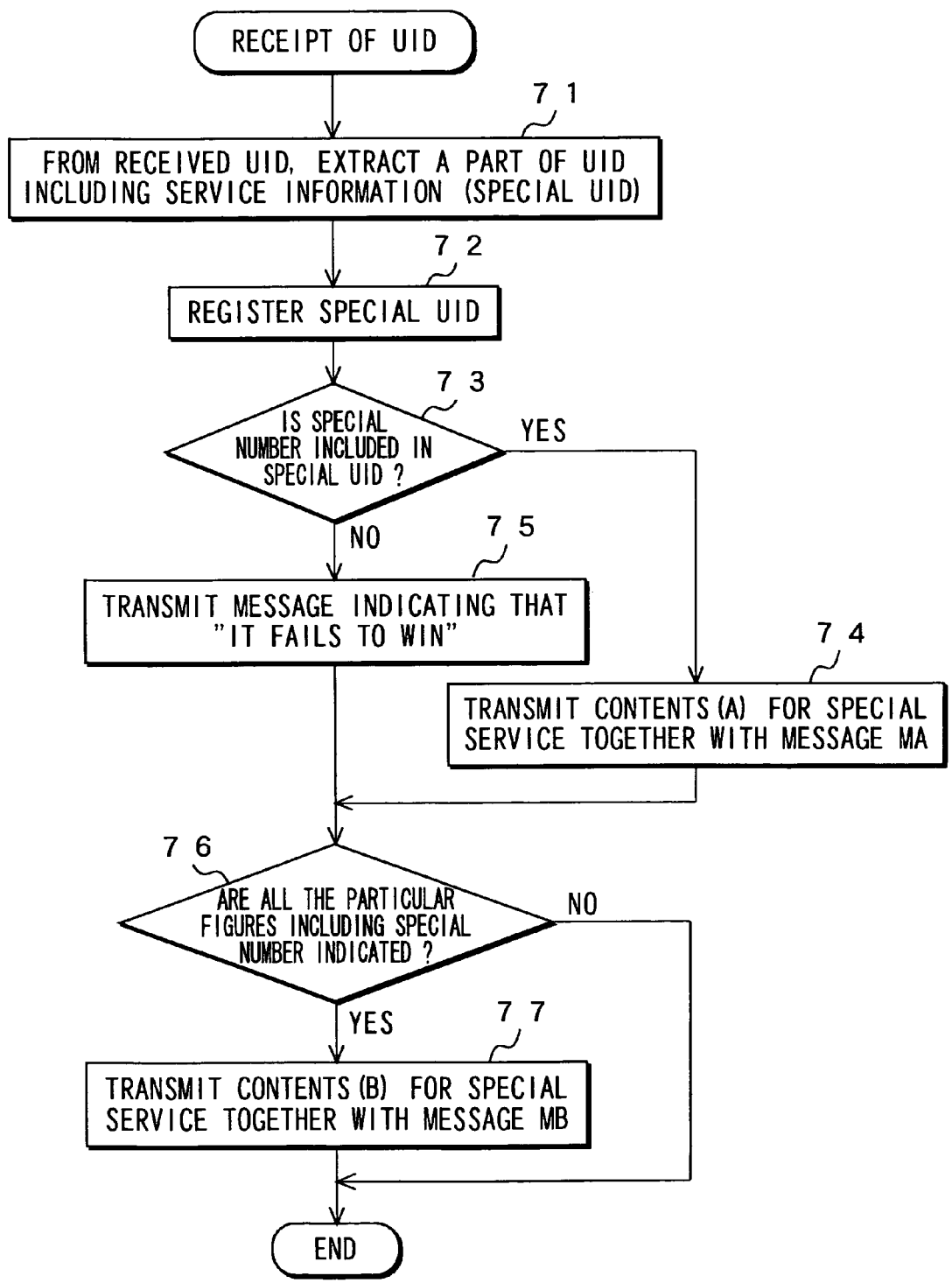
FIG. 10 is a flowchart for showing an example of processing on the side of an administrative server.

Subsequently, a procedure for processing toward transmission of contents-data for special service will be described in detail with reference to FIG. 10 and the following. To simplify the description, first a procedure for processing by the administrative server 30 will be described with reference to FIG. 10.

The administrative server 30 first receives medium information UID read out of the optical disc 10a and transmitted and it then authenticates the received medium information UID using administrative information stored in the administrative database unit 33 of the administrative server 30. Specifically speaking, it checks the information on the serial number (medium identification information) included in the medium information UID against administrative information stored in the administrative database unit 33 to verify whether the received medium information UID is legitimate medium information, and the user identification information (special identification information) is then extracted from the medium identification information (Step 71). The extracted special identification information is saved or registered on the administrative database unit 33 (Step 72).

Next, it verifies whether this special identification information is identical or corresponds to the information on the winning number that has been now registered in the administrative database unit 33 (Step 73). If the special identification information corresponds to the information on the winning number, it transmits contents-data "A" for special service together with data MA on winning message to provide the user with free contents-data "A" for special service (Step 74). Transmitting the data MA on winning message allows the user to verify that the user identification information of the medium information UID stored in the optical disc 10a the user himself or herself owns corresponds to the information on the winning number, namely, to certify that it is the winning number and acquire the contents-data for special service.

On the other hand, if it verifies whether this special identification information is different from the information on the winning number at Step 73, data MX on failure message indicating that "it fails to win" is transmitted to the user (Step 75). It then verifies whether the user identification information yet accessed including the failure user identification information that is saved in the administrative database unit 33 satisfies a requirement of indication of all the particular figures shown in FIG. 9 (Step 76). If it verifies that the requirement of indication of all the figures shown in FIG. 9 is satisfied at Step 76, the administrative server transmits to the terminal device 20 the contents-data "B" for special service and data MB on the winning message, respectively, and this service process is then completed (Step 77).

It is noted that, not shown, if the password or the medium information UID transmitted from the user is authenticated improperly by the password or the medium identification information during their authentication processing, the administrative server requests the terminal device to retransmit the password or the medium information UID to perform the authentication processing again. If the password or the medium information UID is authenticated improperly even by this second authentication processing, it may transmit to the user a message (message data) that this service processing will be stopped and stops the service processing. The processing based on the relevant information included in the medium information UID is carried out before or after the processing shown in FIG. 10 is carried out.

Figure 11:
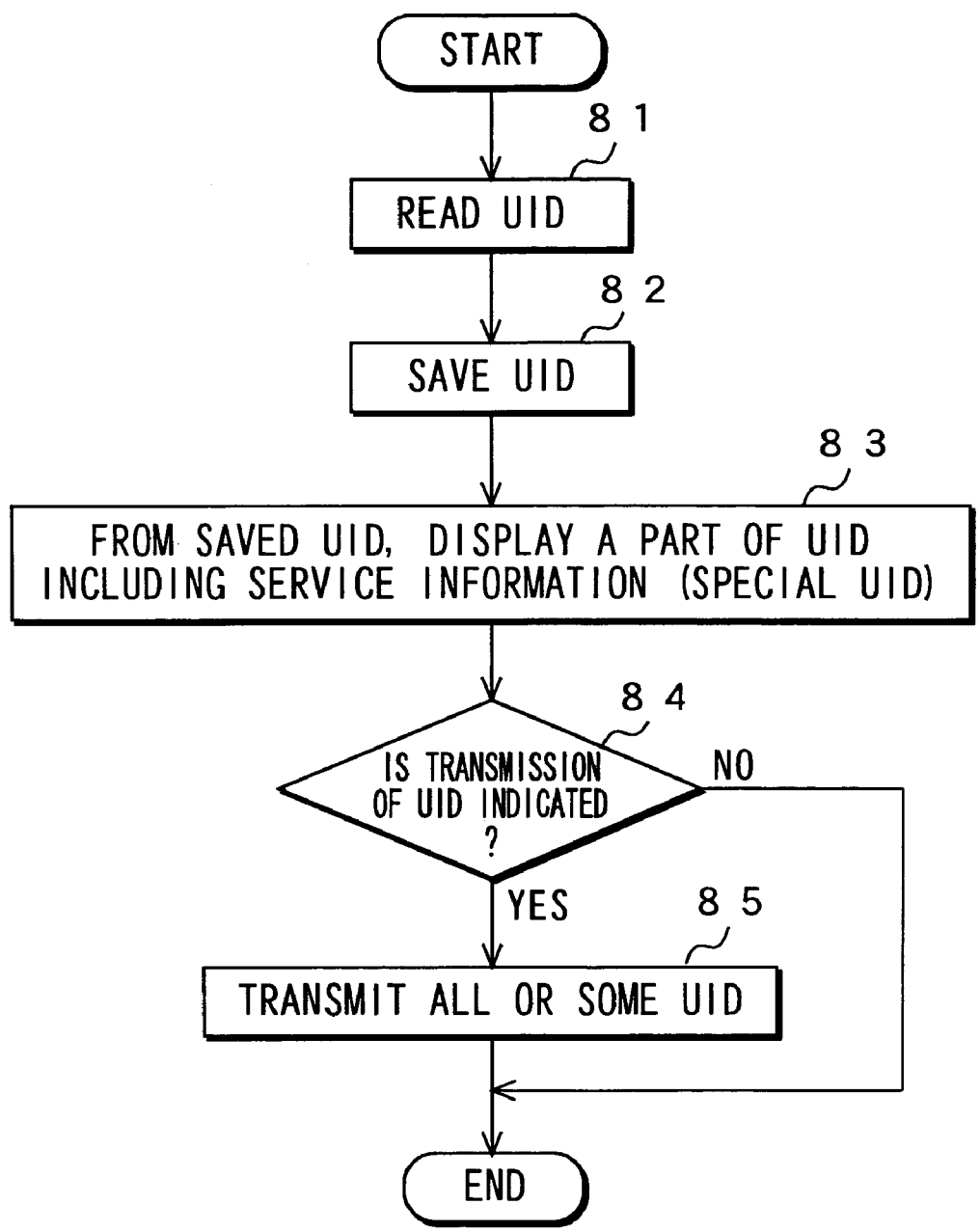
FIG. 11 is a flowchart for showing an example of processing on the side of a terminal device.

FIG. 11 is a flowchart for showing a procedure of processing on the terminal device 20. The information reproduction device 50 first turns to reproduction mode, and the terminal device 20 reads data, which is information stored in the optical disc 10a, out thereof and saves the medium information UID read out of the optical disc 10a in the memory 63 (Steps 81, 82). Next, pending to the request of the user, it displays on the display unit 25 special identification information, which is the user identification information, from the medium information UID saved in the memory 63 (Step 83). Displaying the user identification information on the display unit 25 allows the user to verify whether or not the user identification information read out of the optical disc 10a corresponds to the winning number.

When the user operates the input unit 26 by which the transmission of medium information UID is indicated (Step 84), the control unit 22 accesses the administrative server 30 via the communication network 40 such as the Internet and after certifying the connection with the administrative server 30, it transmits to the administrative server 30 all the medium information UID, only the medium identification information or special identification information included in the medium identification information (Step 85), and stops the transmission processing of the medium information with being ready for receiving data or information which is transmitted from the administrative server 30.

Figure 12:
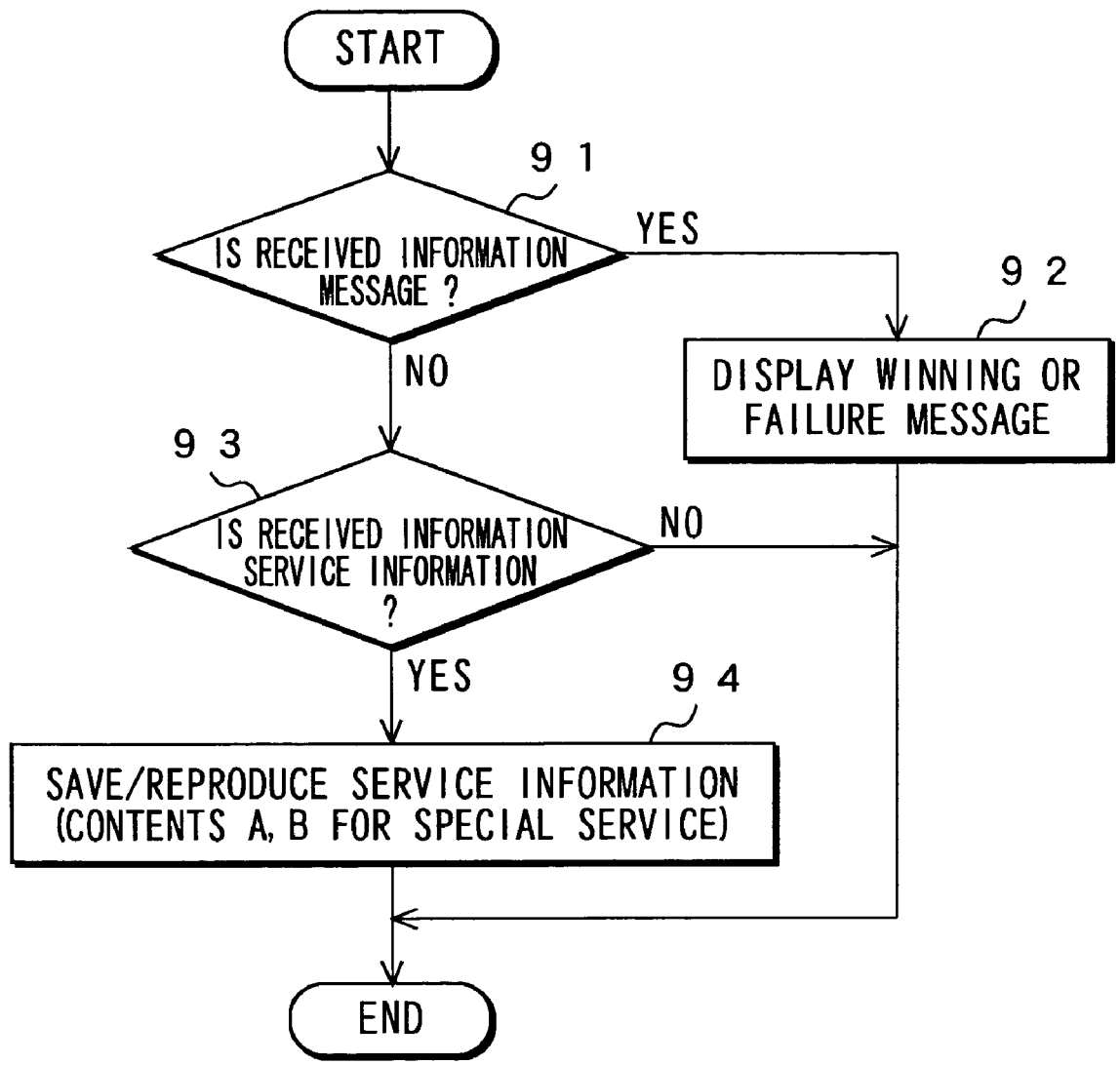
FIG. 12 is a flowchart for showing an example of processing on the side of an administrative server.

FIG. 12 shows an example of a procedure of processing for information reception. If the information transmitted from the administrative server 30 relates to the data on message, it verifies which it is the data MA on the winning message or the data MX on the failure message to display the message based on the verified data on the message (steps 91, 92). If the information transmitted from the administrative server 30 does not relate to the data on message but the contents-data for special service, the device 20 displays the message based on the data MA or MB on the winning message corresponding thereto and then it writes the contents-data for special service in the memory 63 to save the contents-data, thus the procedure is stopped (Steps 93, 94). The contents-data for special service may be reproduced concurrently with the reception thereof.

Figure 13:
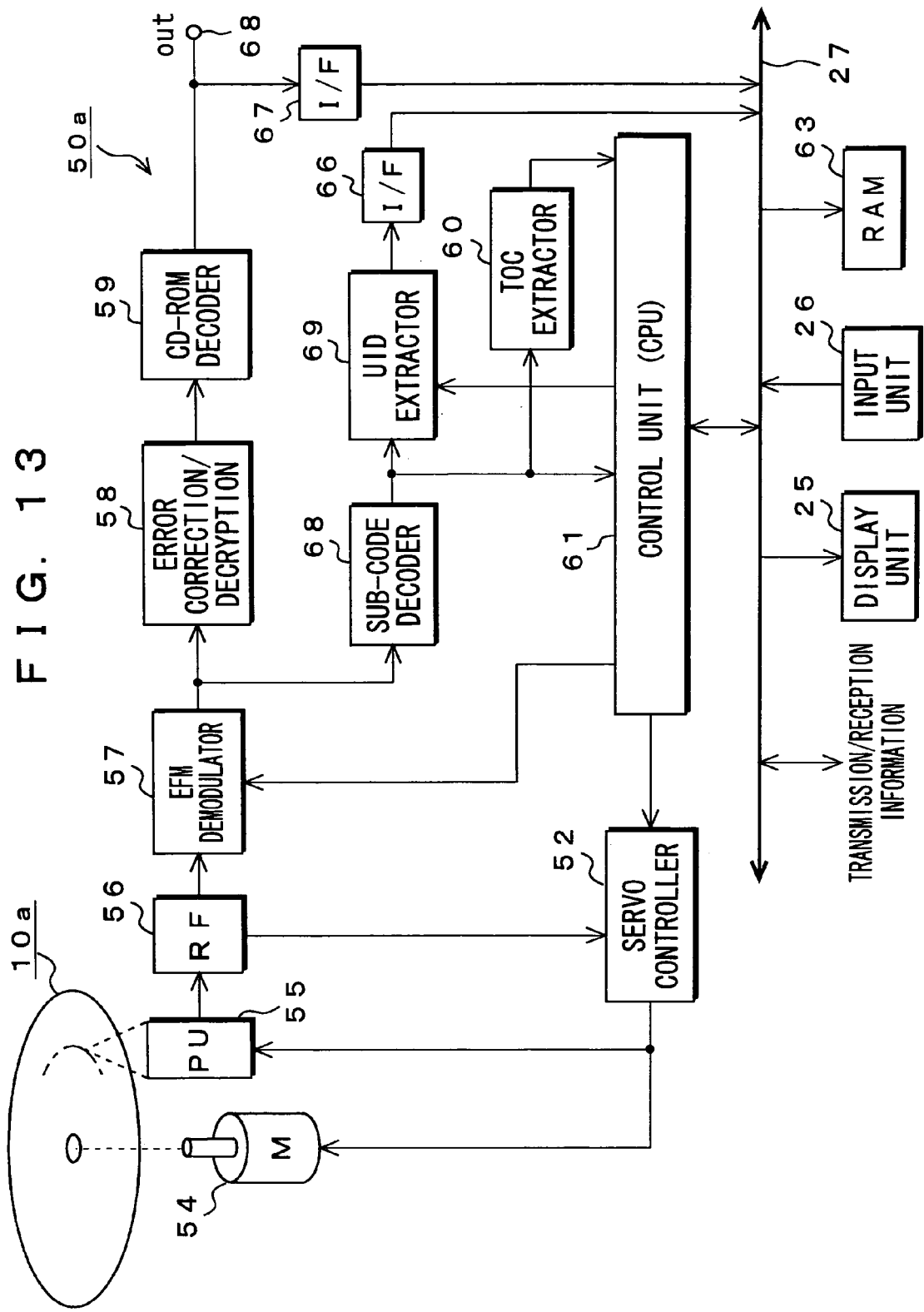
FIG. 13 is a system diagram of a substantial part for showing another embodiment of a medium information reproduction device related to the present invention.

FIG. 13 shows another embodiment of the above-mentioned medium information reproduction device.

A case where the medium information reproduction device is shown in FIG. 7 when the optical disc 10a having the program area 14a wherein the medium information UID is recorded is reproduced while a case where the medium information reproduction device 50a is shown in FIG. 13 when the optical disc 10a having the lead-in area 12a wherein the medium information UID is recorded is reproduced. In FIG. 13, like members are indicated as like indication symbols in FIG. 7 and thus, the detailed explanation thereof will be omitted.

In a case shown in FIG. 13, output data demodulated with EFM demodulator 57 is supplied to a downstream-side error correction/decryption circuit 58 where it performs error correction processing and decryption processing. Output data from the error correction/decryption circuit 58 is then supplied to CD-ROM decoder 59 where it performs decode processing on the decrypted output data according to CD-ROM system, thus returning it to former data (original data) that is the one before it has been recorded in the optional disc 10a. The output data from the CD-ROM decoder 59 is supplied to output processing unit, not shown, such as audio reproduction circuit through the output terminal 68 and stored in the memory 63 via the interface 67 according to the needs.

The output data, which has performed EFM demodulation by the demodulator 57, is also supplied to a sub-code decoder 68 where it is decoded. Since the medium information UID may be inserted into a user area (mode 7) of sub-code Q in the optical disc 10a, for example, the output 1 data obtained by decoding the sub-code data Q is also supplied to medium information (UID) extraction unit 69 where the inserted medium information UID is extracted and separated from an area in the mode 7, which is the user area, of the sub-code Q. The medium information UID thus extracted and separated is temporarily saved in the memory 63 through the interface 66. A part of the output data from the sub-code decoder 68 is also supplied to TOC information read-out unit 60 where TOC information is extracted and separated from the output data of the sub-code decoder 68 and then the extracted TOC information is supplied to the control unit 61.

Thus, if the medium information UID is inserted into the sub-code Q, the medium information UID can be extracted from the data read out of the optical disc 10a. Further, it is possible to display the user identification information, which is a part of the extracted medium information UID, on the display unit 25. Using the transmission/reception unit 24, it may be also transmitted to the administrative server 30.

It is to be noted that the above-mentioned identification information UID can be recorded as a part of the above-mentioned TOC information in the PMA area 18 on the optical disc 10 serving as a recordable recording medium by using laser light emitted from a laser light source of the recording/reproducing device, that is, laser light which is used to record information in the program area. By performing complete processing or finalize processing on the optical disc 10, it is possible to record in the lead-in area 16 medium information UID recorded in the PMA area 18 as TOC information. The PMA area 18 in which TOC information is recorded temporarily is an area in which the user cannot record data by operating the recording/reproducing device.

According to the present invention, the above-mentioned identification information UID can be additionally recorded on a reproduction-only recording medium, that is, the optical disc 10a shown in FIG. 2 on which data has been recorded by a plurality of pits beforehand. In this case, the medium information UID is recorded using, for example, high-power laser on the optical disc 10a on which information (data) has been recorded beforehand. The medium information UID is recorded in any one of the lead-in area, the lead-out area, and the program area. One example of the recording method will be described below with reference to FIG. 14 and the following.

FIG. 14 shows one example of an optical-disc creation system including a medium-information-recording device. This optical-disc creation system comprises a modulated-signal delivery device 140 for modulating information or data to be recorded on the optical disc 10a, which provides a finally finished product, to generate a modulated signal and deliver it, a laser-beam recorder 600 which is an original optical-disc recording device for recording information or data on an original optical disc 320 according to the modulated signal, a shaping device 700 for shaping a disc substrate of a semi-finished optical disc 340, and a additional-writing device 200 for additionally writing information or data to the semi-finished optical disc 340. The additional-writing device 200 is used to record the above-mentioned medium information UID. The modulated-signal delivery device 140 comprises a recorded-information reproduction unit 150 for reading and reproducing information or data to be recorded on an optical disc, a modulated-information generation unit 160 for converting the information or data thus reproduced into a modulated signal, which is based on a predetermined modulation method, a modulated-information storage unit 170 for storing the modulated signal, and a modulated-signal output unit 180 for outputting the modulated signal.

The recorded-information reproduction unit 150 sequentially reproduces predetermined information of data recorded on all over the regions of a master optical disc 310, performs error correction processing etc. on the reproduced data, and then supplies it to the modulated-information generation unit 160. The master optical disc 310 is a recordable optical disc such as a CD-R disc, in which predetermined information or data to be recorded on an original optical disc 320 is recorded. The predetermined information or data is arbitrary data such as music data, image data, or programs.

The modulated-information generation unit 160 converts the information or data reproduced by the reproduction unit 150 into a modulated signal, which is based on a predetermined modulation method predefined, writes the modulated signal obtained as a result of the conversion in the modulated-information storage unit 170, and supplies it to the modulated-signal output unit 180. The modulated signal is made up of a bit pattern comprising "1" or "0" prescribed by a predetermined modulation method. At time of modulation processing by the generation unit 160, as the occasion demands, additional-write relevant information 410 is referred which indicates specification of a region in which the medium information UID is to be written additionally, or the like.

The modulated-information storage unit 170 stores the modulated signal generated by the modulated-signal generation unit 160. The modulated-signal output unit 180 receives the modulated signal generated by the modulated-signal generation unit 160 and outputs a bit pattern comprising "1" or "0" to the laser-beam recorder 600 at a predetermined clock speed.

The laser-beam recorder 600 irradiates an original optical disc 320 with laser light modulated on the basis of the modulated signal that is received from the modulated-signal delivery device 140, thereby performing cutting, that is, recording data on the original disc 320. This original optical disc 320 undergoes exposure processing and plating processing in this order, to provide a stamper 330.

The shaping device 700 performs, on this stamper 330, injection molding of a material of synthetic resin such as polycarbonate, thus forming a disc substrate which has an irregular pattern on its one surface. On the one surface of the formed disc substrate, a reflection film made of a material such as Al is adhered and, on the reflection film a protection film is formed to create the semi-finished optical disc 340.

The semi-finished optical disc 340 refers to an optical disc on which data has been already recorded but the medium information UID as additional-write information has not yet been recorded.

The additional-writing device 200 comprises a modulated-information storage unit 210 for storing the additional-write relevant information 410 or a modulated signal supplied from the modulated-signal delivery device 140, an additional-writing control unit 220 for controlling additional-writing operations, and an additional-writing unit 230 for additionally writing the medium information UID as additional-write information on the semi-finished optical disc 340 under the control of the additional-writing control unit 220.

The modulated-information storage unit 210 stores the additional-write relevant information 410 used by the modulated-signal delivery device 140 or the modulated signal supplied from the modulated-signal delivery device 140. The additional-writing control unit 220 controls, based on the additional-write relevant information 410 or the modulated signal, operations for calculating a region on the optical disc 340 in which additional-write information 420, which is the medium information UID, is recorded and for additionally writing the additional-write information 420 stored in a memory, not shown, in this calculated region.

The additional-writing unit 230 comprises an additional-writing laser light source (not shown) for emitting high-power laser light. The additional-writing unit 230 records the additional-write information 420, which is medium information peculiar to the semi-finished optical disc 340 stored in the memory, not shown, on this optical disc by irradiating it with high-power laser light under the control of the additional-writing control unit 220, thus creating an optical disc 350 as a finished product on which the additional-write information 420 is recorded. This optical disc 350 refers to the optical disc 10a as a recording medium on which the above-mentioned medium information UID is recorded.

In the additional-writing device 200, the modulated-information storage unit 170 previously stores the modulated signal or the additional-write relevant information 410 used by the modulated-signal delivery device 140. Based on the additional-write relevant information 410 or the modulated signal, the additional-writing control unit 220 controls the additional-writing unit 230 so that a region of the optical disc 340 in which the additional information is to be recorded is calculated and the additional-write information 420 may be additionally recorded in this calculated region. The additional-writing unit 230 additionally records the medium information UID as the additional-write information 420 on the semi-finished optical disc 340 under the control of the additional-writing control unit 220, thus creating the finished optical disc 350.

As a method for additionally writing the additional-write information, a method is available for generating a modulation signal in which an un-modulation zone is provided in an arbitrary zone of the modulation signal when information or data is modulated in the modulated-signal delivery device to manufacture a semi-finished optical disc and recording additional-write information in the un-modulated zone at the additional-writing device, thus manufacturing an optical disc as a finished product.

FIG. 14 shows its one example. The modulated-signal delivery device 140 acquires from the additional-write relevant information 410 information required to insert an un-modulation zone in a signal modulated by an EFM method (hereinafter referred to as "EEM data pattern"). In this case, it is arbitrary and not specified which portion of the EFM data pattern the un-modulation zone is to be inserted or how often the un-modulation zone is to be inserted. However, in a case where several un-modulation zones are inserted or an un-modulation zone having a certain length is inserted, an interval at which the several un-modulation zones are inserted or a length of the un-modulation zone itself is set so that servo tracking of laser light may be possible, that is, the consecutive un-modulation zones may not exceed a servo tracking band when the additional-write information 420 is recorded by irradiating, with the laser light, the semi-finished optical disc 340 in which the un-modulation zones are inserted. A method for this servo tracking is not limited in particular. In the example of FIG. 15, a sub-coding portion is set as the un-modulation zone. The un-modulation zone can be provided at an arbitrary location of a sub-decoding portion and a data portion where data is recorded excluding a synchronous pattern. Further, a plurality of un-modulation zones can be provided at a certain interval or at a random interval.

In accordance with such the additional-write relevant information 410, the modulated-information generation unit 160 generates a modulated signal (hereinafter referred to as "EFM signal") in which an un-modulation zone is provided at a portion of an EFM data pattern and outputs it to the laser-beam recorder 600. The EFM signal, which is output to the laser-beam recorder 600, that is, an EFM signal to be recorded on the original optical disc 320 has such a waveform that a signal level may be 0 at the sub-coding portion. As a result thereof, no pit is present at the sub-decoding portion, which is an un-modulation zone on the semi-finished optical disc 340 as created.

In the additional-wiring device 200, it acquires the additional-write relevant information 410 and the modulated-information storage unit 210 stores the information. The additional-writing control unit 220 performs EFM modulation on the additional-write information 420 and forms pits in the sub-coding portion by controlling an additional-writing laser light source in the additional-writing unit 230 for emitting high-power laser so that the EFM-modulated additional-write information may be additionally recorded in a zone that corresponds to the sub-coding portion. In FIG. 15, a hatched portion indicates a pit formed on the basis of the additional-write information 420. On the optical disc 350 as a finished product on which data is additionally written by the additional-writing device 200, in its zone corresponding to the sub-coding portion, the modulated signal of the additional-write information 420 which has been modulated by the same modulation method as that used for information recorded in the program area of the optical disc 350 is recorded.

In such a manner, on a semi-finished optical disc having information or data recorded on it, additional-write information is recorded which has been modulated by the same modulation method as that employed to modulate the information or data to be recorded on the optical disc. By recording different data of medium information as additional-write information on each different disc, it may be read as information peculiar to the optical disc. If an optical disc product having medium information additionally written to it is mounted in a reproduction device that accommodates the conventional EFM modulation method, it is possible to reproduce information or data including contents recorded on the optical disc as well as the medium information given as additional-write information. It is thus possible to read medium information as information peculiar to an optical disc and reproduce the medium information without a necessity of providing the reproduction device with a special circuit for reproduction.

As the recording method for recording additional-write information such as medium information on a recorded recording medium, besides the above-mentioned example, there may be available such a method as to comprise the steps of manufacturing a semi-finished optical disc by generating an EFM signal which has modulated information or data in the modulated-signal delivery device, and manufacturing a finished optical disc by recording additional-write information in an arbitrary zone, for example, a zone where a particular data pattern is formed, as referencing an EFM data pattern generated by the modulated-signal delivery device in the additional-writing device, details of which are eliminated.

INDUSTRIAL APPLICABILITY

The present invention can be applied to a recordable or reproduction-only recording medium such as CD-R and CR-ROM, a terminal device for reading information out of the recording medium, a recording method for recording medium identification information including user identification information in the recording medium, a server device for providing the terminal device with service information, information transmission method between the terminal device and the server device, and information service system in which they are respectively implemented.

The invention claimed is:

1. A recording medium, comprising:
a lead-in region;
a recording region in which information is recorded; and
a lead-out region,
wherein medium information including medium identification information is recorded in at least any one of the lead-in region, the recording region, and the lead-out region, said medium identification information including user identification information that is accessible by a user,
wherein said user identification information relates to information used for determining whether or not contents-data are to be received by the user; and
wherein said medium information includes a serial number peculiar to said medium, and said user identification information consists of a part of said serial number.

2. The recording medium according to claim 1, wherein in said medium, relevant information relating to said recording medium is further recorded together with said medium identification information, said relevant information being included in said medium information.

3. The recording medium according to claim 1, wherein in said recording region, multiple irregular patterns are formed on the basis of information.

4. The recording medium according to claim 3, wherein said medium information is additionally recorded in said recording medium.

5. An information transmission method, comprising:
transmitting, from a terminal device to a server device, medium information read out of a recording medium, said recording medium comprising a lead-in region, a recording region in which information is recorded, and a lead-out region, wherein medium information including medium identification information is recorded in at least any one of the lead-in region, the recording region, and the lead-out region, the medium identification information including user identification information that is accessible by a user, wherein said user identification information relates to information used for determining whether or not contents-data are to be received by the user, and wherein said medium information includes a serial number peculiar to said medium, and said user identification information consists of a part of said serial number;

causing the server device to verify the transmitted medium information for authenticating it; and while performing check processing on the user identification information when the transmitted medium information is authenticated properly, controlling information transmission to the terminal device on the basis of a result of the check processing.

6. The information transmission method according to claim 5, wherein said server device transmits the contents-data to said terminal device when said user identification information corresponds to particular information stored in said server device based on said result of the check processing.

7. The information transmission method according to claim 6, wherein when said contents-data is transmitted, said user identification information is transmitted to said terminal device together with information indicating that said user identification corresponds to said particular information stored in said server device.

8. The information transmission method according to claim 7, wherein when said user identification information fails to correspond to said particular information stored in said server device based on said result of the check processing, said server device transmits to said terminal device information indicating that said user identification information fails to correspond to said particular information.

9. The information transmission method according to claim 5, wherein said server device stores user identification information that has been transmitted until then, wherein said server device performs additional check processing on information in which said stored user identification information and the user identification information included in said transmitted medium identification information are added to each other, and further particular information; and wherein, when said added information corresponds to said further particular information based on a result of said additional check processing, said server device transmits the contents-data to said terminal device.

10. The information transmission method according to 5, wherein said medium information is authenticated with said medium identification information and the administrative information stored in said server device.

11. The information transmission method according to claim 10, wherein said server device requests retransmission of said medium information to said terminal device when the transmitted medium information is authenticated improperly.

12. The information transmission method according to claim 11, comprising the step of stopping processing when medium information re-transmitted from said terminal device is authenticated improperly.

13. The information transmission method according to claim 10, further comprising checking said serial number and said administrative information.

14. A terminal device, comprising:

a head portion for reading out information recorded on a recording medium, said recording medium comprising a lead-in region, a recording region in which information is recorded, and a lead-out region, wherein medium information including medium identification information is recorded in at least any one of the lead-in region, the recording region, and the lead-out region, the medium identification information including user identification information that is accessible by a user, wherein said user identification information relates to information used for determining whether or not contents-data are to be received by the user, and wherein said medium information includes a serial number peculiar to said medium, and said user identification information consists of a part of said serial number;

a decode processing portion configured to perform decode processing on an output signal provided from the head portion;

an extraction portion configured to extract the medium information from an output signal provided from the decode processing portion;

a transmission-and-reception portion configured to transmit the medium information extracted by this extraction portion and to receive information transmitted from an outside device; and a control portion configured to perform an operation control based on the information read out of the lead-in region of the recording medium by the head portion and the information received by the transmission-and-reception portion, and allowing to cause the user identification information read out of the recording medium by the head portion to be displayed.

15. The terminal device according to claim 14, further comprising a display portion, wherein said control portion is configured to cause the user identification information read out of the recording medium by the head portion to be displayed.

16. The terminal device according to claim 15, further comprising a storage portion, wherein said storage portion is confianred to store the medium information extracted by said extraction portion.

17. The terminal device according to claim 14, further comprising a storage portion, wherein when the information received by said transmission-and-reception portion is the contents-data, and said control portion is configured to cause said received contents-data to be stored on said storage portion.

18. A server device, comprising:

a transmission-and-reception portion for receiving medium information transmitted after being read out of a recording medium by a terminal device and transmitting information, said recording medium comprising a lead-in region, a recording region in which information is recorded, and a lead-out region, wherein at least medium identification information is recorded in at least any one of the lead-in region, the recording region, and the lead-out region, said medium identification information including user identification information that is accessible by a user, wherein said user identification information relates to information used for determining whether or not contents-data are to be received by the user, and wherein said medium information includes a serial number peculiar to said medium, and said user identification information consists of a part of said serial number;

a storage portion in which at least administrative information including the medium information is stored; and a control portion for authenticating the medium information received based on the medium information received by the transmission-and-reception portion and the medium information stored in the storage portion, for allowing check processing of the user identification information to be performed when the received medium information is authenticated properly, and for controlling information transmission operation to the terminal device on the basis of a result of check processing.

19. The server device according to claim 18, wherein said storage portion stores particular information for checking said user identification information and the contents-data; and wherein when said user identification information corresponds to said particular information stored in said storage portion based on a result of said check processing, said control portion controls the transmission-and-reception portion to transmit said contents-data out of said storage portion.

20. The server device according to claim 19, wherein said control portion is configured to cause information indicating that said user identification information corresponds to said particular information to be transmitted when transmitting said content-data.

21. The server device according to claim 20, wherein said control portion allows to be transmitted information indicating that said user identification information fails to correspond to said particular information when failing to correspond to said particular information based on a result of said check processing.

22. The server device according to claim 18, wherein said storage portion stores user identification information that has been transmitted by then and contents-data for additional service; and wherein said control portion allows information in which said stored user identification information and the user identification information included in said transmitted medium identification information are added to each other and further particular information to be additionally checked; and wherein when said added information corresponds to said further particular information based on a result of said additional check processing, said contents-data for additional service is read out of said storage portion and transmitted.

23. The server device according to claim 18, wherein said control portion is configured to cause said serial number and said administrative information to be checked.

24. The server device according to claim 18, wherein said control portion controls said transmission-and-reception portion to transmit a signal to request for retransmitting said medium information when said received medium information is authenticated improperly.

25. The server device according to claim 24, wherein said control portion allows stop of processing when said retransmitted medium information is authenticated improperly.

26. A recording method, comprising:
recording medium information including medium identification information, said medium identification information including user identification information that is accessible by a user, in at least any one of a lead-in region, a recording region, and a lead-out region of a recording medium, said recording medium comprising a disc substrate in whose one surface a plurality of irregular patterns based on information is formed, a reflection film formed on the one surface of the disc substrate, and a protection film for protecting this reflection film as well as the lead-in region, the recording region in which the above-mentioned information is recorded, and the lead-out region,
wherein said user identification information relates to information used for determining whether or not contents-data are to be received by the user; and
said medium information includes a serial number peculiar to said medium, and said user identification information consists of a part of said serial number.

\* \* \* \* \*